United States Patent
Thakur et al.

(10) Patent No.: US 11,082,862 B1
(45) Date of Patent: Aug. 3, 2021

(54) CELL SITE PLACEMENT SYSTEM

(71) Applicant: AT&T Intellectual Property I, L.P., Atlanta, GA (US)

(72) Inventors: Gaurav Thakur, Matawan, NJ (US); Danielle Liu, Morganville, NJ (US); Arun Jotshi, Parsippany, NJ (US); Ashwin Sridharan, Edison, NJ (US); Kathleen Meier-Hellstern, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/842,071

(22) Filed: Apr. 7, 2020

(51) Int. Cl.
  *H04W 16/18* (2009.01)
  *G06K 9/00* (2006.01)
  *G06T 7/30* (2017.01)
  *H04W 24/08* (2009.01)

(52) U.S. Cl.
  CPC ........ *H04W 16/18* (2013.01); *G06K 9/00536* (2013.01); *G06T 7/30* (2017.01); *H04W 24/08* (2013.01)

(58) Field of Classification Search
  CPC ........ H04W 16/18; H04W 24/08; G06T 7/30; G06K 9/00536
  USPC ........................................................ 455/446
  See application file for complete search history.

(56) References Cited

U.S. PATENT DOCUMENTS

| | | | |
|---|---|---|---|
| 7,162,507 B2 * | 1/2007 | Carter | H04L 41/22 370/229 |
| 9,848,337 B2 * | 12/2017 | Puthenpura | H04W 16/18 |
| 2001/0041565 A1 * | 11/2001 | Vicharelli | H04W 16/18 455/423 |
| 2017/0150365 A1 * | 5/2017 | Goswami | H04W 16/18 |
| 2019/0320326 A1 * | 10/2019 | Benedetto | H04W 16/18 |

* cited by examiner

*Primary Examiner* — William Nealon
(74) *Attorney, Agent, or Firm* — BakerHostetler

(57) ABSTRACT

A device includes a processor and a memory. The processor effectuates operations including generating a plurality of tiles for a designated region and classifying each of the plurality of tiles based on whether each tile is associated with a deployment zone. The operations further including clustering locations associated with one or more tiles of the plurality of tiles, wherein the one or more tiles are classified as being associated with the deployment zone, wherein the clustering generates at least one vertex. The operations further including forming a polygon based on the at least one vertex. The operations further including providing a map of the designated region including the polygon at a location in the map associated with the deployment zone, wherein the deployment zone is one or more areas of service within the designated region that are prioritized for new or additional services, or infrastructure based on design criteria.

17 Claims, 14 Drawing Sheets

270

272

274

CELL SITE PLACEMENT SYSTEM

TECHNICAL FIELD

This disclosure is directed to a system for cell site deployment.

BACKGROUND

The wide adoption of mobile devices along with ubiquitous cellular data coverage has resulted in the unprecedented growth of mobile applications that are dependent on always-accessible wireless networking. The growth in the use of mobile applications has placed strains on resources that are increasingly scarcer. For users, this scarcity may result in dropped calls and poor communication, which may cause user dissatisfaction.

To meet the huge demand for mobile applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

This background information is provided to reveal information believed by the applicant to be of possible relevance. No admission is necessarily intended, nor should be construed, that any of the preceding information constitutes prior art.

SUMMARY

The present disclosure is directed to a device having a processor and a memory coupled with the processor. The processor effectuates operations including generating a plurality of tiles for a designated region. The processor further effectuates operations including classifying each of the plurality of tiles based on whether each tile is associated with a deployment zone. The processor further effectuates operations including clustering locations associated with one or more tiles of the plurality of tiles, wherein the one or more tiles are classified as being associated with the deployment zone, wherein the clustering generates at least one vertex. The processor further effectuates operations including forming a polygon based on the at least one vertex. The processor further effectuates operations including providing a map of the designated region including the polygon at a location in the map associated with the deployment zone, wherein the deployment zone is one or more areas of service within the designated region that are prioritized for new or additional services, or infrastructure based on design criteria.

The present disclosure is directed to a computer-implemented method. The computer-implemented method includes generating, by a processor, a plurality of tiles for a designated region. The computer-implemented method further includes classifying, by the processor, each of the plurality of tiles based on whether each tile is associated with a deployment zone. The computer-implemented method further includes clustering, by the processor, locations associated with one or more tiles of the plurality of tiles, wherein the one or more tiles are classified as being associated with the deployment zone, wherein the clustering generates at least one vertex. The computer-implemented method further includes forming, by the processor, a polygon based on the at least one vertex. The computer-implemented method further includes providing, by the processor, a map of the designated region including the polygon at a location in the map associated with the deployment zone, wherein the deployment zone is one or more areas of service within the designated region that are prioritized for new or additional services, or infrastructure based on design criteria.

The present disclosure is directed to a computer-readable storage medium storing executable instructions that when executed by a computing device cause said computing device to effectuate operations including generating a plurality of tiles for a designated region. Operations further include classifying each of the plurality of tiles based on whether each tile is associated with a deployment zone. Operations further include clustering locations associated with one or more tiles of the plurality of tiles, wherein the one or more tiles are classified as being associated with the deployment zone, wherein the clustering generates at least one vertex. Operations further include forming a polygon based on the at least one vertex. Operations further include providing a map of the designated region including the polygon at a location in the map associated with the deployment zone, wherein the deployment zone is one or more areas of service within the designated region that are prioritized for new or additional services, or infrastructure based on design criteria.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
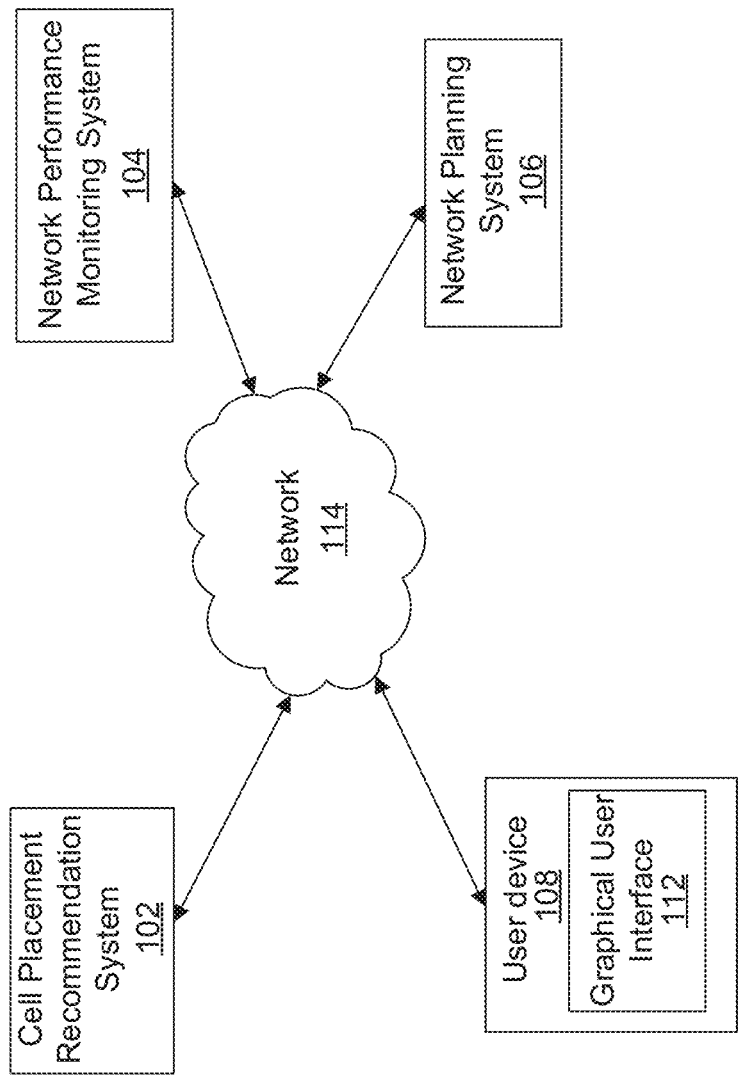
FIG. 1A is a block diagram of an exemplary operating environment in accordance with the present disclosure.

With the introduction of new telecommunications technologies (e.g., LTE, 5G, etc.) improving a telecommunications network infrastructure to provide new or additional services to users is essential. Accordingly, telecommunications service providers spend a large amount of effort deciding what regions to prioritize for the placement of cell sites. The prioritization may be in consideration of large areas, for example, a country, state, province, city, etc. The prioritization process is manual and is typically based on a network designer's experience from previous deployments and other local knowledge related to cell deployments. Accordingly, the prioritization process is often tedious, time consuming, and prone to errors.

Correct placement of cell sites is even more significant for new technology, such as 5G cell sites utilizing mmWave spectrum, due to the characteristics of mmWave propagation. Improper placement of cell sites can have a lasting effect for the telecommunications service providers (e.g. coverage gaps, poor customer experience, additional infrastructure deployment to address poorly placed cell sites, additional costs, etc.).

5G networks can support data communication between conventional user equipment (e.g., phones, smartphones, tablets, PCs, televisions, Internet enabled televisions, etc.), as well as data communication between equipment, such as smart cars in association with driverless car environments, and machine type communications (MTCs). To meet the demand for data centric applications, features of proposed 5G networks are being designed to ultimately utilize an increased peak bit rate (e.g., 20 Gbps), larger data volume per unit area (e.g., high system spectral efficiency, for example, about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks are expected to eventually allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

Some 5G networks may also utilize higher frequencies (e.g., >6 GHz). Currently, much of a millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Referring to FIG. 1A, a system 100 may include a cell placement system 102, a network performance monitoring system 104, a network planning system 106 and a user device 108. The cell placement system 102, the network performance monitoring system 104, the network planning system 106, and the user device 108 may be communicate with each other via network 114. The network 114 may include a wide area network (WAN), such as the Internet, a local area network (LAN), such as a wireless local area network (WLAN), or other type of networks.

The cell placement system 102 may be a computing device (e.g., a server), which may be used to determine a current wireless communications infrastructure for a region having one or more tiles. The tiles may be indicative of a wireless communication coverage area. The cell placement system 102 may evaluate data for the region, such as network performance data and profile data associated with a user (e.g., customer), which is commonly associated with a user equipment. The data for the region may include coverage factors and user factors associated with the region, which may be obtained from data sources, for example, the network performance monitoring system 104. The data may be aggregated and anonymized to maintain user privacy. The cell placement system 102 may maintain one or more maps indicating cell site locations. The one or more maps may be divided into a plurality of tiles (e.g., 0.1 square miles, 1 to 2 square miles, 100 meters by 100 meters, or 1% or less of a square unit of the map). For example, the cell placement system may store a map of the United States, which may be divided into tiles. For each tile, the cell placement system 102 may collect and average data from several data sources (e.g., network performance monitoring system 104, network planning system 106 and user device 108) which provide aggregated, anonymized data that may be used to determine and provide a cell site(s) placement recommendation.

The cell placement system 102 may also identify top deployment zones, which may be particular areas of service within the region. The deployment zone may take into consideration a particular technology (e.g. 4G LTE or mmWave 5G) that should be prioritized for new or additional services or infrastructure (e.g., cell tower, base station, mobile base station, autonomous or unmanned vehicle serving as a base station, etc.) within the region as a function of designer specified criteria (e.g., number of nodes per square mile, budget constraints, etc.) provided by a designer or planning system. The input preferences may be selected based on what-if scenarios in order to provide insight into placing a cell site at a given location in a deployment zone and how the cell site placement may affect coverage within the deployment zone.

When identifying deployment zones, the cell placement system 102 may utilize machine learning. Machine learning may be used to train a statistical classification model using network performance data and profile data associated with each tile to determine whether a given tile is or is not in a relevant deployment zone. For illustrative purposes, deployment zones described herein may be in reference to 5G cell cites utilizing mmWave spectrum ("5G zones"). The 5G zones that were previously selected by site planners in conventional deployments may be used as training data, indicating whether each tile is in a 5G zone or is not in a 5G zone. The statistical classification model may be trained using the 5G zone data. The statistical classification model may be, for example, a logistic regression or a support vector machine having class that may be used as weights in a loss function. When considering large areas having many tiles, employing class weights may be useful since the number of deployment zone tiles typically account for small fraction of the training dataset of tiles (e.g., tiles for an entire state or country). The class weights may be utilized to prevent the statistical classification model from being biased towards tiles that are not in 5G zones. The statistical classification model may assign a numerical score called a class likelihood to each tile, which indicates how likely it is that a tile falls in a 5G zone.

The cell placement system 102 may also provide automated recommendations for future cell site placement(s) at a determined location (within a polygon) based on the identified 5G zones, which may be transmitted to the network planning system 106 or the user device 108. For example, the cell placement system 102 may cluster output tiles, which may include one or more points, from the statistical classification model and form polygons around locations associated with each cluster. The polygon may be a circle, square, ellipse or any bounded shape. The polygon shape may be in consideration of a variety of factors (e.g., municipal laws and line of sight to areas on the ground) The cell placement system 102 may utilize a cluster model, for example, K-means clustering or density-based spatial clustering of applications with noise (DBSCAN) on the tiles inside 5G zones, which may use the class likelihoods as weights. The cell placement system 102 may also form and display a polygon around each cluster. For example, each cluster may contain 10-30 tiles or more, which is a typical deployment zone size chosen by RAN planners. The cell placement system 102 may provide recommendations in consideration of technologies to be implemented (e.g., 5G mmWave, 5G, 4G, LTE, NB-IoT, UMTS, GSM, CDMA, etc.).

The network performance monitoring system 104 may collect network statistics (e.g., average signal strength, successful call rate, and successful handover rate with respect to average signal strength and successful rate) from one or more cell sites within one or more regions. The network performance monitoring system 104 may also include a business support system and operational support systems, (BSS/OSS application). OSS performance counters and statistics may be utilized to facilitate the collection of the network statistics for a particular region(s), portion of a network or the entire network. The network statistics collected may be utilized to determine whether a region is underserved or overserved (e.g., there is more traffic than the one or more cell sites servicing the region can be adequately handle), or if there are coverage gaps due to buildings or other obstructions within the region.

The network performance monitoring system 104 may also collect aggregated or anonymized profile data related to the network as it is experienced by a user (e.g., through the respective user device). The profile data may also include data related to mobile application usage, mobile device type or model, as well as indications that the user may be an early adopter of services provided by a service provider. For example, early adoption may be determined based on profile data indicating customers who purchase new mobile phones within a predetermined period from the release of the new mobile phone, which customers are downloading new applications, which customers are using new services within a predetermined period from the release of the new services, locations where customers are being added or lost, etc. The profile data may be obtained from a variety of active monitoring, passive monitoring, or user engagement (e.g., surveys, polls, etc.). The network performance monitoring system 104 may utilize the network statistics or profile data to obtain an assessment of the network performance for a region.

The network planning system 106 may be a system that is used by designers for network planning. The network planning may entail proposing locations, configurations, and settings for new network nodes (cell sites) to be constructed at the proposed locations. The proposed locations and configuration of network parameters (e.g., quality of service) may be based on, for example, technologies to be implemented (e.g., 5G NR, LTE, NB-IoT, UMTS, GSM, CDMA, etc.), antenna models, antenna heights, azimuth, and tilt angles, etc. Upon finalization of a network plan, the new cells sites may be constructed according to the network plan.

The user device 108 may include, for example, a personal computer, a laptop computer, or a mobile device. The user device 108 may include a graphical user interface (GUI) 112 shown in a display. In some examples, data may be provided to the graphical user interface 112 (e.g., for presentation or output) by a communication device (e.g., cell placement system 102, network performance monitoring system 104, or network planning system 106).

The graphical user interface 112 may include a user input interface. In some examples, the user input interface may detect input or a selection of a request automated recommendation of a location(s) for cell site placement. In some examples, the GUI 112 may display one or more polygons and clustered points indicating 5G zones.

Figure 1B:
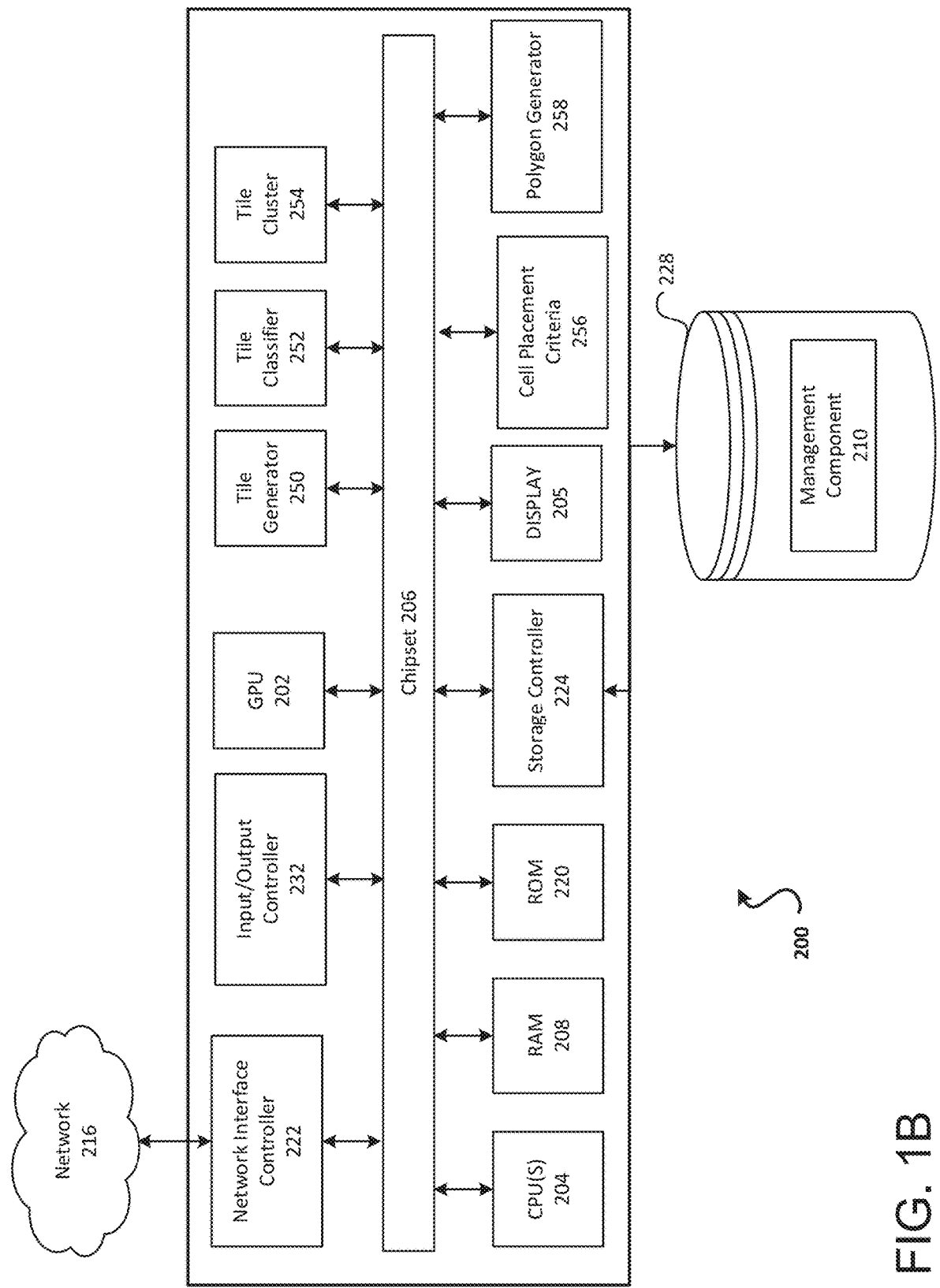
FIG. 1B is a block diagram of an exemplary computing device in accordance with the present disclosure.

FIG. 1B depicts a computing device that may be used in various aspects, such as the servers, modules, or devices depicted in FIG. 1. With regard to the example architecture of FIG. 1A, the cell placement system 102, the network performance monitoring system 104, the network planning system 106, and the user device 108 may each be implemented in an instance of a computing device 200 of FIG. 1B. The computer architecture shown in FIG. 1B may illustrate a server computer, workstation, desktop computer, laptop, tablet, network appliance, PDA, e-reader, digital cellular phone, or other computing node, and may be utilized to execute any aspects of the computers described herein, such as to implement the methods described herein.

The computing device 200 may include a baseboard, or "motherboard," which is a printed circuit board to which a multitude of components or devices may be connected by way of a system bus or other electrical communication paths. One or more central processing units (CPUs) 204 may operate in conjunction with a chipset 206. The CPU(s) 204 may be standard programmable processors that perform arithmetic and logical operations necessary for the operation of the computing device 200.

The CPU(s) 204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 204 may be augmented with or replaced by other processing units, such as GPU(s) 202. The GPU(s) 202 may comprise processing units specialized for but not necessarily limited to highly parallel computations, such as graphics rendering and other visualization-related processing. In some examples, the GPU 202 may render a user interface(s), which may detect input (e.g., selections of a user) and present/output visible indicia.

A chipset 206 may provide an interface between the CPU(s) 204 and the remainder of the components and devices on the baseboard. The chipset 206 may provide an interface to a random-access memory (RAM) 208 used as the main memory in the computing device 200. The chipset 206 may further provide an interface to a computer-readable storage medium, such as a read-only memory (ROM) 220 or non-volatile RAM (NVRAM) (not shown), for storing basic routines that may help to start up the computing device 200 and to transfer information between the various components and devices. ROM 220 or NVRAM may also store other software components necessary for the operation of the computing device 200 in accordance with the aspects described herein.

The computing device 200 may operate in a networked environment using logical connections to remote computing nodes and computer systems through local area network (LAN) 216. The chipset 206 may include functionality for providing network connectivity through a network interface controller (NIC) 222, such as a gigabit Ethernet adapter. A NIC 222 may be capable of connecting the computing device 200 to other computing nodes over a network 216. It should be appreciated that multiple NICs 222 may be present in the computing device 200, connecting the computing device to other types of networks and remote computer systems.

The computing device 200 may be connected to a mass storage device 228 that provides non-volatile storage for the computer. The mass storage device 228 may store system programs, application programs, other program modules, and data, which have been described in greater detail herein. The mass storage device 228 may be connected to the computing device 200 through a storage controller 224 connected to the chipset 206. The mass storage device 228 may consist of one or more physical storage units. A storage controller 224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 200 may store data on a mass storage device 228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 228 is characterized as primary or secondary storage and the like.

For example, the computing device 200 may store information to the mass storage device 228 by issuing instructions through a storage controller 224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 200 may further read information from the mass storage device 228 by detecting the physical states or characteristics of one or more particular locations within the physical storage units.

In addition to the mass storage device 228 described above, the computing device 200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 228 depicted in FIG. 1B, may store an operating system utilized to control the operation of the computing device 200. The operating system may comprise a version of the LINUX operating system. According to further aspects, the operating system may comprise a version of the UNIX operating system. Various mobile phone operating systems may also be utilized. It should be appreciated that other operating systems may also be utilized. The mass storage device 228 may store other system or application programs and data utilized by the computing device 200.

The mass storage device 228 or other computer-readable storage media may also be encoded with computer-executable instructions, which, when loaded into the computing device 200, transforms the computing device from a general-purpose computing system into a special-purpose computer capable of implementing the aspects described herein. These computer-executable instructions transform the computing device 200 by specifying how the CPU(s) 204 transition between states, as described above. The computing device 200 may have access to computer-readable storage media storing computer-executable instructions, which, when executed by the computing device 200, may perform methods described herein.

A computing device, such as the computing device 200 depicted in FIG. 1B, may also include an input/output controller 232 for receiving and processing input from a number of input devices, such as a keyboard, a mouse, a touchpad, a touch screen, an electronic stylus, or other type of input device. Similarly, an input/output controller 232 may provide output to a display 205, such as a computer monitor, a flat-panel display, a digital projector, a printer, a plotter, or other type of output device. It will be appreciated that the computing device 200 may not include all of the components shown in FIG. 1B, may include other components that are not explicitly shown in FIG. 1B, or may utilize an architecture completely different than that shown in FIG. 1B.

For at least one of the cell placement system 102, the network performance monitoring system 104, the network planning system 106, or the user device 108, the computing device 200 may also include a tile generator 250, a tile classifier 252, a tile cluster component 254, a cell placement criteria component 256, and a polygon generator 258. The tile generator 250 may divide a map or a portion thereof and generate a plurality of tiles according to a specified tile size. The tile generator 250 may also compute various features (e.g. downlink traffic, profitability, etc.) for each generated tile. The tile classifier 252 may be utilized to predict 5G zone (or other technology used in a site build) candidates. For example, the tile classifier 252 may utilize a logistic regression model to predict whether a tile is a potential 5G zone candidate.

The tile cluster component 254 may utilize a statistical classification model to determine whether a tile is associated with a 5G zone based on network statistics, profile data, or design criteria (e.g., designer specified criteria). For example, designer specified criteria may include measures of profitability. The network statistics, profile data, or design criteria may be received from a display interface, mobile device, remote apparatus, or other apparatus. For example, network statistics may include uplink traffic and downlink traffic (e.g., monthly data traffic for a region). For example, profile data may include early adopters of one or more services, customer survey results, or the like. The tile cluster component 254 may utilize output from the tile classifier 252 to cluster points. The tile cluster component 254 may utilize spatial clustering and designer-specified criteria to cluster points. The cell placement criteria component 256 may store the network statistics, profile data, or designer specified criteria. The polygon generator 258 may utilize clustered points to generate a polygon for each cluster. Each polygon may indicate a specific 5G zone, which may be used to provide a recommendation of cell site locations for future deployment of new cell sites, as well as provide a ground truth for existing cell sites or manually planned cell site deployments. The polygon shape made be created in light of the network statistics, profile data, and designer specified criteria associated with the points in each tile used to create the polygon. For example, cell sites may be planned for placement on top of a pole or building within the polygon. While the RAN planners may have selected the pole or building, the RAN planners may also have to take into consideration who owns the pole or building, and laws associated with cell site placement within the polygon are applicable. Maximizing a line of sight from the cell site to areas on the ground may also be a consideration by RAN planners, especially for 5G mmWave. Line of sight may be influenced by buildings or other obstructions within the polygon. Accordingly, once a recommended polygon is selected for placement of a cell site by the RAN planners, the RAN planners may inspect an area of the polygon determine a location for placement of cell sites.

As described herein, a computing device may be a physical computing device, such as the computing device 200 of FIG. 1B. A computing node may also include a virtual machine host process and one or more virtual machine instances. Computer-executable instructions may be executed by the physical hardware of a computing device indirectly through interpretation or execution of instructions stored and executed in the context of a virtual machine.

Figure 2A:
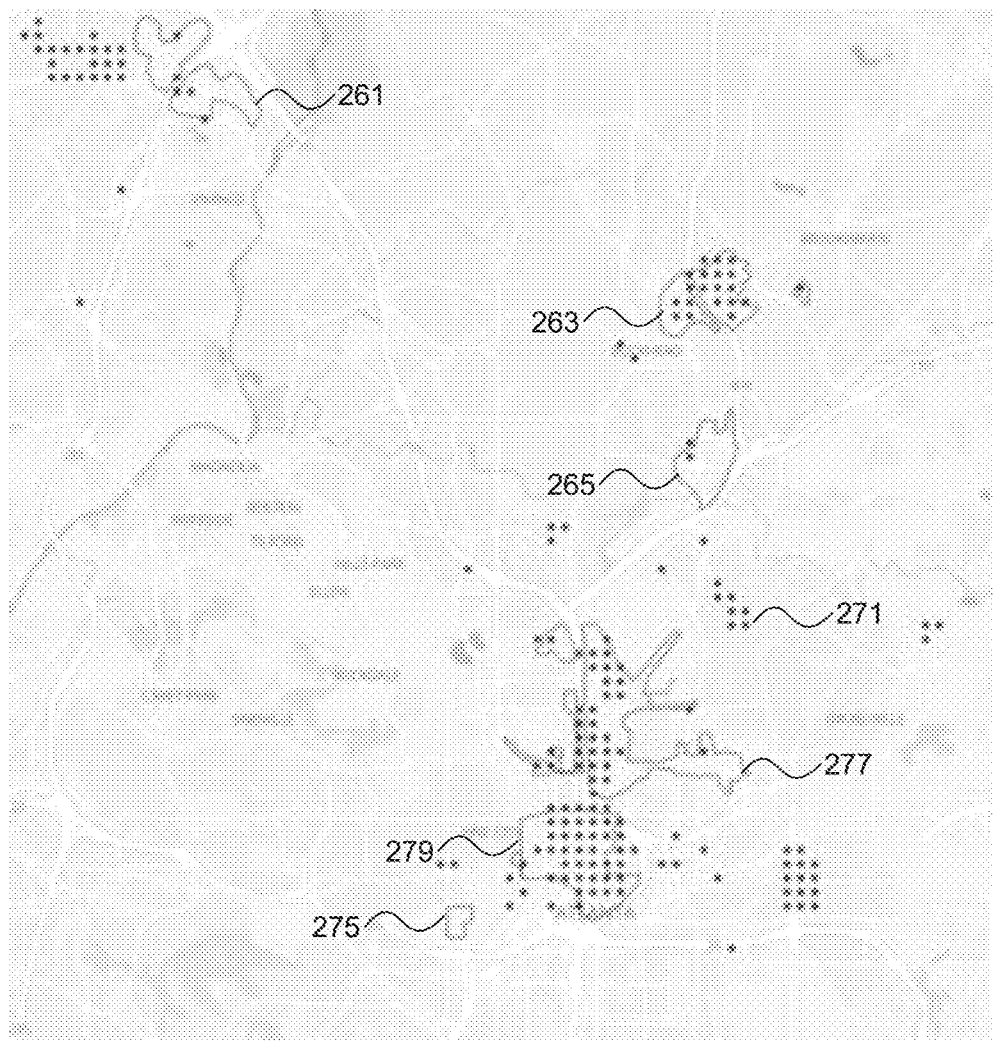
FIG. 2A is an exemplary tile classifier output in accordance with the present disclosure.

FIG. 2A illustrates an exemplary tile classifier output according to one or more embodiments. FIG. 2A also includes 5G zones (e.g., 261, 263, 265, 275, 277, and 279) manually selected (e.g., created) by, for example, RAN planners, which are displayed as polygons and used to train a statistical classification. The RAN planners may select 5G zones based on past experience with selecting deployment zones. The tile classifier 252 may utilize a logistic regression model to output data points and predict whether a tile is a potential 5G zone candidate based on designer specified criteria, profile data, and network statistics. The logistic regression model is a statistical model that uses a logistic function to model a binary dependent variable (e.g., tile is a 5G zone or tile is not a 5G zone). A logistic regression model produces a class likelihood, which may be sorted or ranked. The class likelihood may be applied across all the tiles. The tile classifier output 270 may be displayed as points tied to a location on a map, in which each point (e.g., 271) represents a vertex. The vertex of each point may be used to create a polygon. Accordingly, the polygon shape may be based on the vertices of the points tied to the location the map.

Figure 2B:
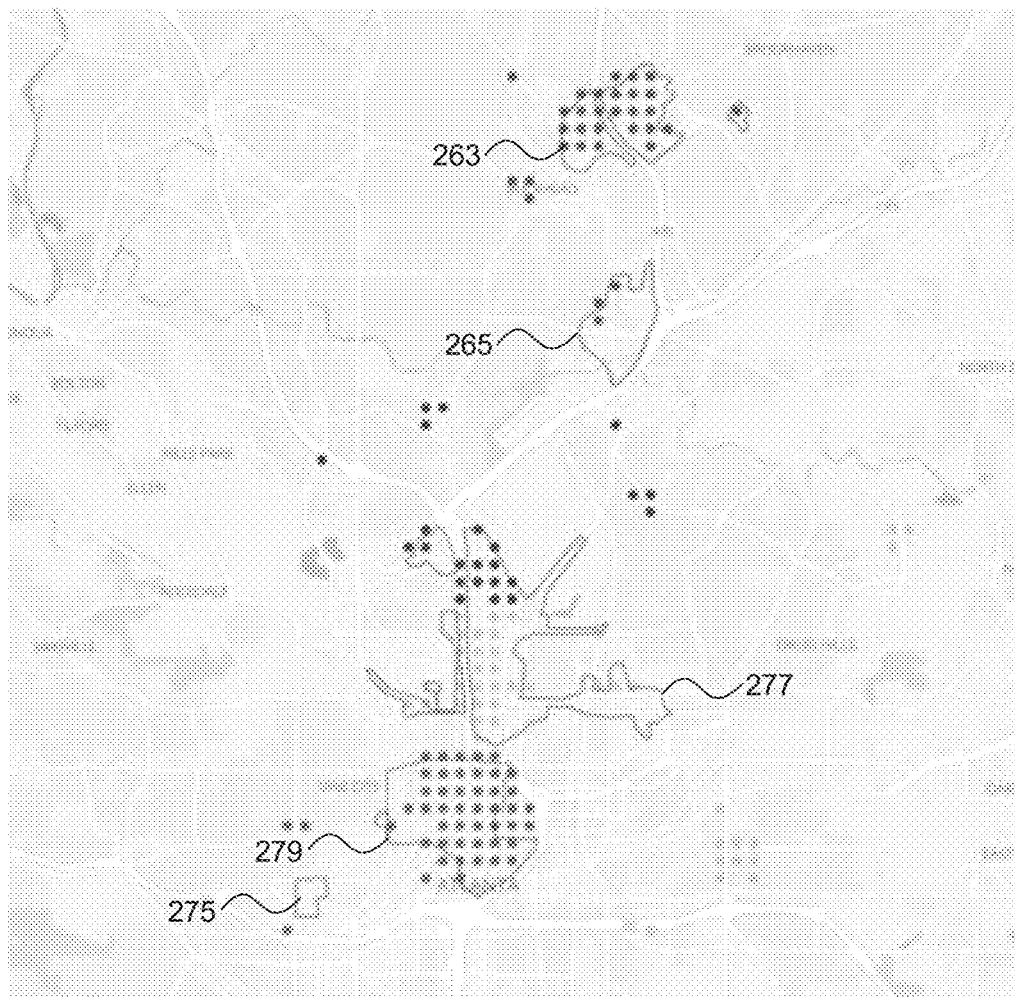
FIG. 2B is an exemplary tile cluster output in accordance with the present disclosure.

FIG. 2B illustrates an exemplary tile cluster output according to one or more embodiments. FIG. 2B also includes 5G zones 263, 265, 275, 277, and 279, manually selected, which are displayed as polygons. The tile cluster component 254 may utilize weighted K-means clustering or DBSCAN clustering to identify clusters in the points output by the tile classifier 252. K-means clustering is a clustering algorithm that may be used on the points output by the tile classifier 252 that can form clusters having proportional sizes and linearly separable data. DBSCAN clustering is a clustering algorithm that may be used on the points output by the tile classifier 252 that have disproportional cluster sizes and whose data can be separated in a non-linear fashion. Accordingly, the tile cluster output 272 generated by the tile cluster component 254 may output clusters forming typical shapes (e.g., circle, square, rectangle, etc.) via K-means clustering and output clusters forming non-typical shapes via DBSCAN clustering, or a combination thereof using K-means clustering and DB SCAN clustering. In addition, in instances where the tile cluster output 272 contains multiple clusters, the tile cluster component 254 may assign a display color to each cluster in the tile cluster output 272.

Figure 2C:
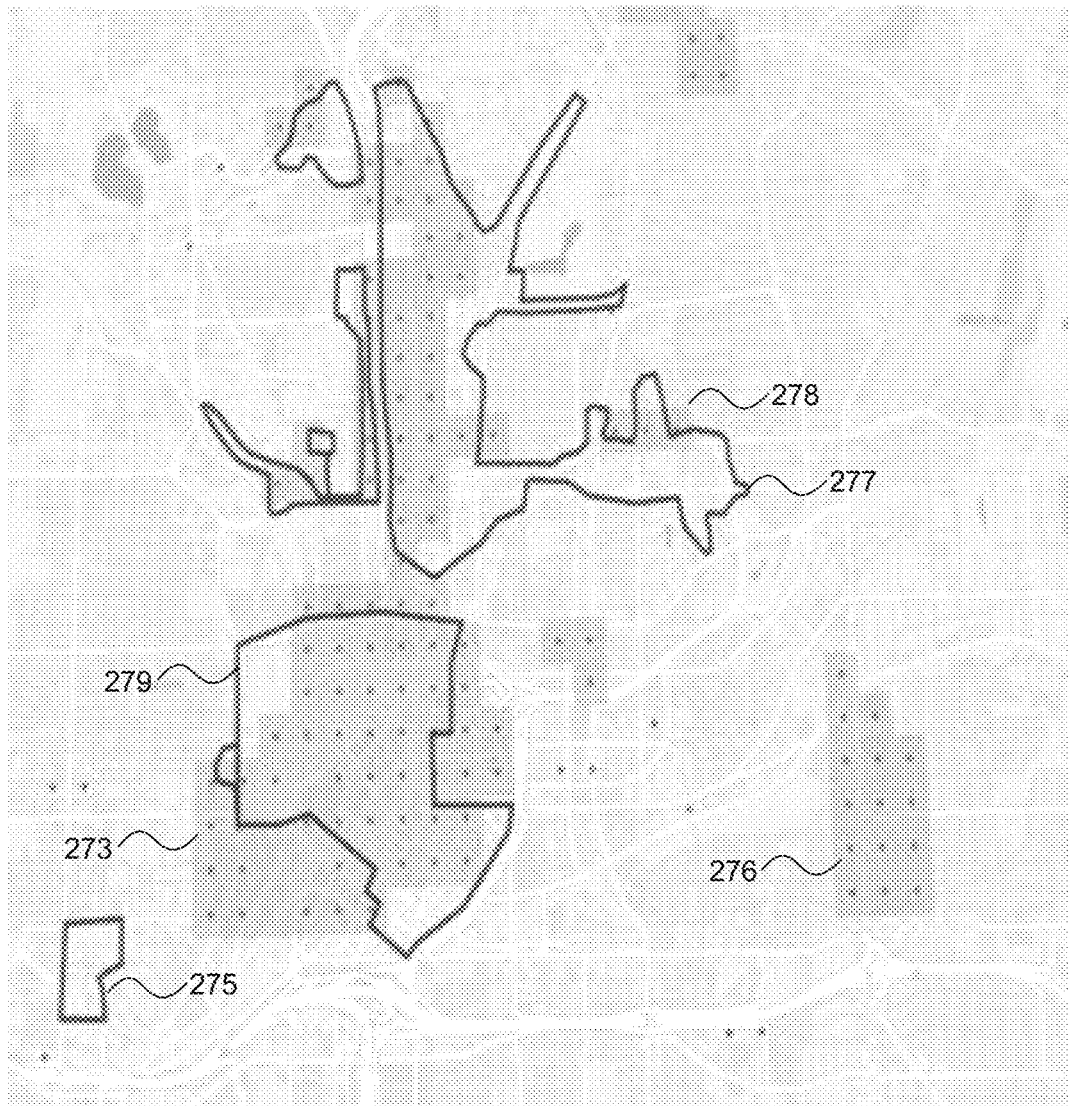
FIG. 2C is an exemplary polygon generator output in accordance with the present disclosure.

FIG. 2C illustrates an exemplary polygon generator output according to one or more embodiments. FIG. 2C also includes 5G zones manually selected, which are displayed as polygons (e.g., polygons 275, 277, and 279). The polygon generator 258 may apply a cluster polygonization process that analyses each cluster output by the tile cluster component 254. Based on the analysis of each cluster, the polygon generator 258 may approximate a shape for each cluster. The polygon generator 258 may generate a polygon (e.g., polygons 273, 276, and 278) on the map for each cluster (polygon generator output 274). Polygons may be for example, a convex hull or contour polygon. Accordingly, polygon generator 258 may output a map having multiple polygons in which each polygon may be indicative of a 5G zone. The polygon generator output 274 may be transmitted to the network planning system 106 as an automated recommendation for cell site locations for future deployment of new cell sites, as well as provide a ground truth for existing cell sites or planned cell site deployments based on the identified 5G zones in a given region. The recommendation may be utilized by the network planning system 106 to determine a number of cell site deployments in a given region, locations for each cell site deployment, as well as a priority for each cell site deployment. In addition, the automated recommendation may be used to verify whether planning of new 5G zones selected by RAN engineers is correct (e.g., polygon 279 selected by RAN planners in comparison with polygon 273 generated by the polygon generator 558, which coincide), or if the planning of new 5G zones may need to be re-evaluated (e.g., polygon 275 selected by RAN planners but not selected by the polygon generator 258, or polygon 276 selected by the polygon generator 258 but not selected by the RAN planners).

Figure 3:
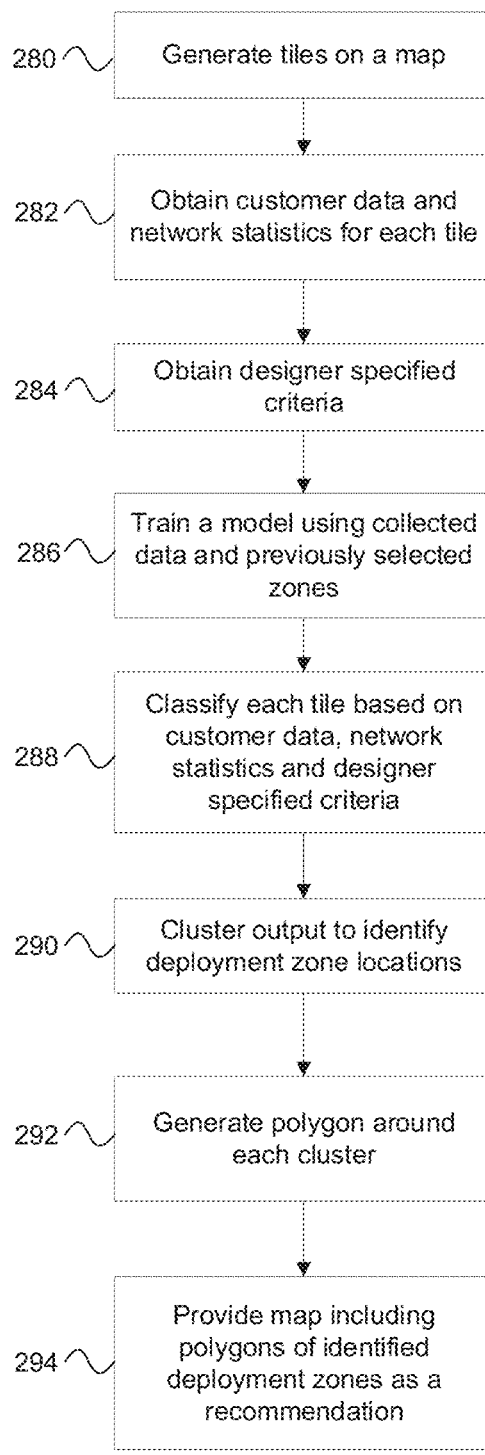
FIG. 3 is a flowchart of an exemplary method of operation in accordance with the present disclosure.

An exemplary operational flowchart in accordance with a method of the present disclosure is illustrated in FIG. 3. At block 280, the cell placement system 102 may generate a plurality of tiles for a designated region (e.g., country, state, city, portion of a city, etc.) by dividing the region according to a predetermined tile size (e.g., 0.1 square miles, square miles, or 100 meters by 100 meters). At block 282, the cell placement system 102 may obtain profile data and network statistics from the network performance monitoring system 104. At block 284, the cell placement system 102 may obtain designer specified criteria for cell site deployments from the network planning system 106. At block 286, the cell placement system 102 may train a statistical classification model using, for example, deployment zones that were previously selected manually by site planners, network performance data and profile data associated with each tile to determine whether a given tile is or is not in a relevant zone. At block 288, the cell placement system 102 may classify each generated tile to determine whether a given tile is associated with a deployment zone (e.g., 5G zone) based on the profile data and network statistics, as well as the designer specified criteria. Classifying each generated tile may occur in a manner described for FIG. 2A.

At block 290, the cell placement system 102 may cluster points associated with deployment zone tiles to identify deployment zone locations with the deployment zone tile. Clustering points associated with deployment zone tiles may occur in a manner described for FIG. 2B. At block 292, the cell placement system 102 may generate a polygon around each cluster of points in which the polygon represents a deployment zone location and shape. Polygon generation may occur in a manner described in FIG. 2C.

At block 294, the cell placement system 102 may output a map of the designated region having polygons around each cluster of points, which may be used by the network planning system 106 as an automated recommendation. The automated recommendation may be used for locations of future deployment of new cell sites, as well as provide a ground truth for existing cell sites or planned cell site deployments based on the identified deployment zones in the designated region. The output of a map may occur in a manner described in FIG. 2C.

Accordingly, the present disclosure provides a system that may segment a region (e.g., a country, state, district, county, city or other area having definable characteristics but not always fixed boundaries) into a plurality of tiles having a predetermined tile size (e.g., 100 m×100 m tiles). For each tile, the system may collect and average data from several data sources that may be relevant to making decisions about cell site deployments. The data may be related to, for example, profitability, downlink traffic, early adopters of a service, customer survey results, and other factors. The system may also collect data related to existing, manually chosen deployment zones (zones with the region that should be prioritized for new or additional services or infrastructure). The system may utilize the data from several data sources and the collect data related to existing, manually chosen deployment zones to classify the tiles according to whether they fall into a deployment zone or do not fall into a deployment zone. The system may utilize the tile classification information to train a statistical classification model to refine output determinations of whether a given tile falls in a deployment zone or do not fall into, for example, a deployment zone. The statistical classification model may be a logistic regression model or a support vector machine model having class weights in a loss function. The system may segment the outputs of the algorithm into clusters and form polygons around the clusters using a weighted K-means clustering with the class likelihoods as weights or DBSCAN clustering. The system may output polygon data on a map, which may be used to provide an automated recommendation for cell site locations for future deployment of new cell sites, as well as provide a ground truth for existing cell sites or planned cell site deployments based on the identified deployment zones in the designated region.

The automated recommendation may be used to speed up the process of identifying areas for cell site deployments by identifying locations for cell sire deployments using profile data, network statistics, and designer specified criteria. The automated recommendation may also be used to conduct 'what-if' investigations of various deployment scenarios by changing designer specified criteria. The automated recommendation may also result in significant time and cost savings in a planning process as well as improvements in customer experience. Additionally, benefits of the automated recommendation may also include less cell site deployments because the recommended cell site locations provide a desired coverage for a location.

Figure 4:
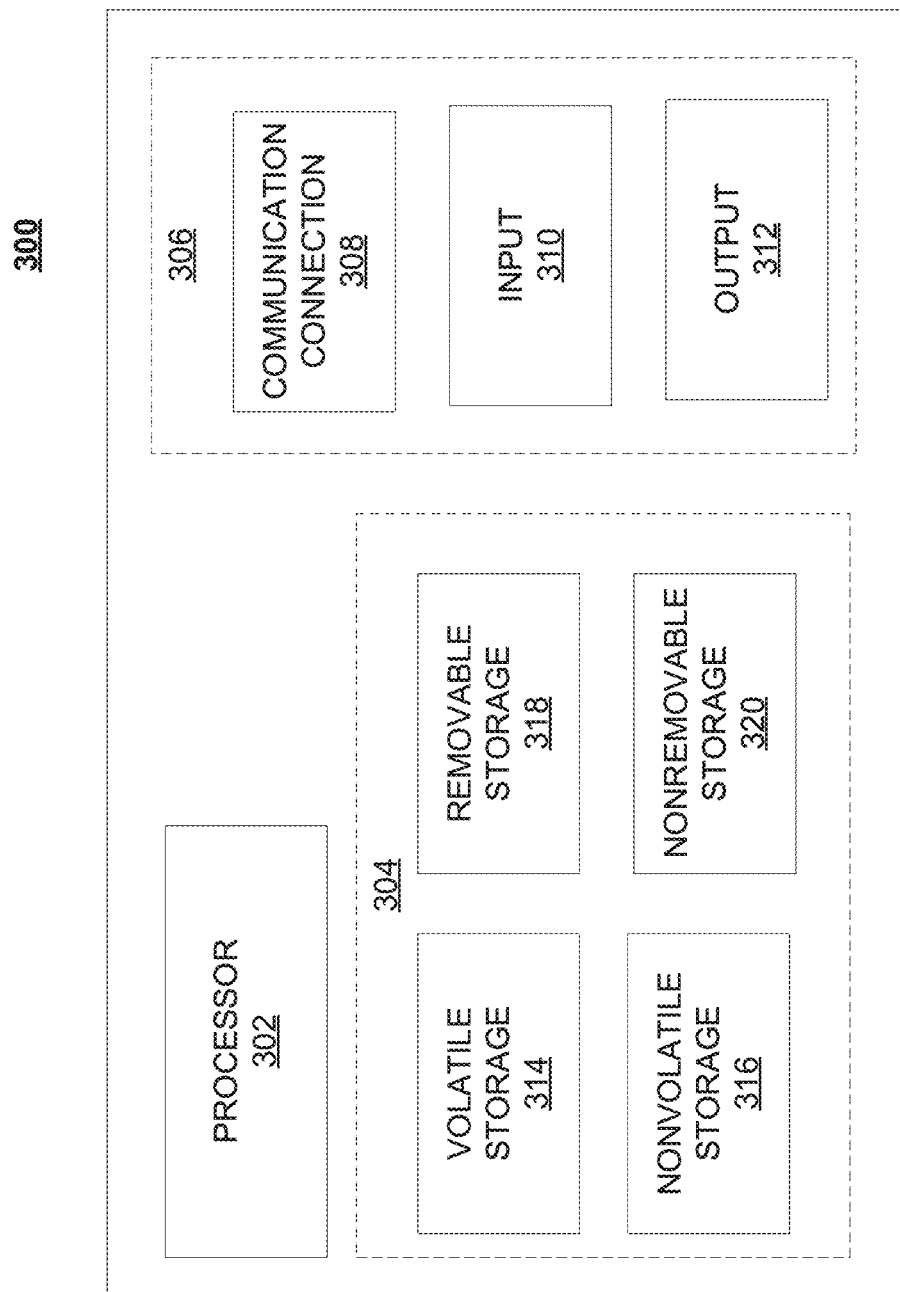
FIG. 4 is a schematic of an exemplary network device.

FIG. 4 is a block diagram of network device 300 that may be connected to or comprise a component of edge computing node or connected to edge computing node via a network. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
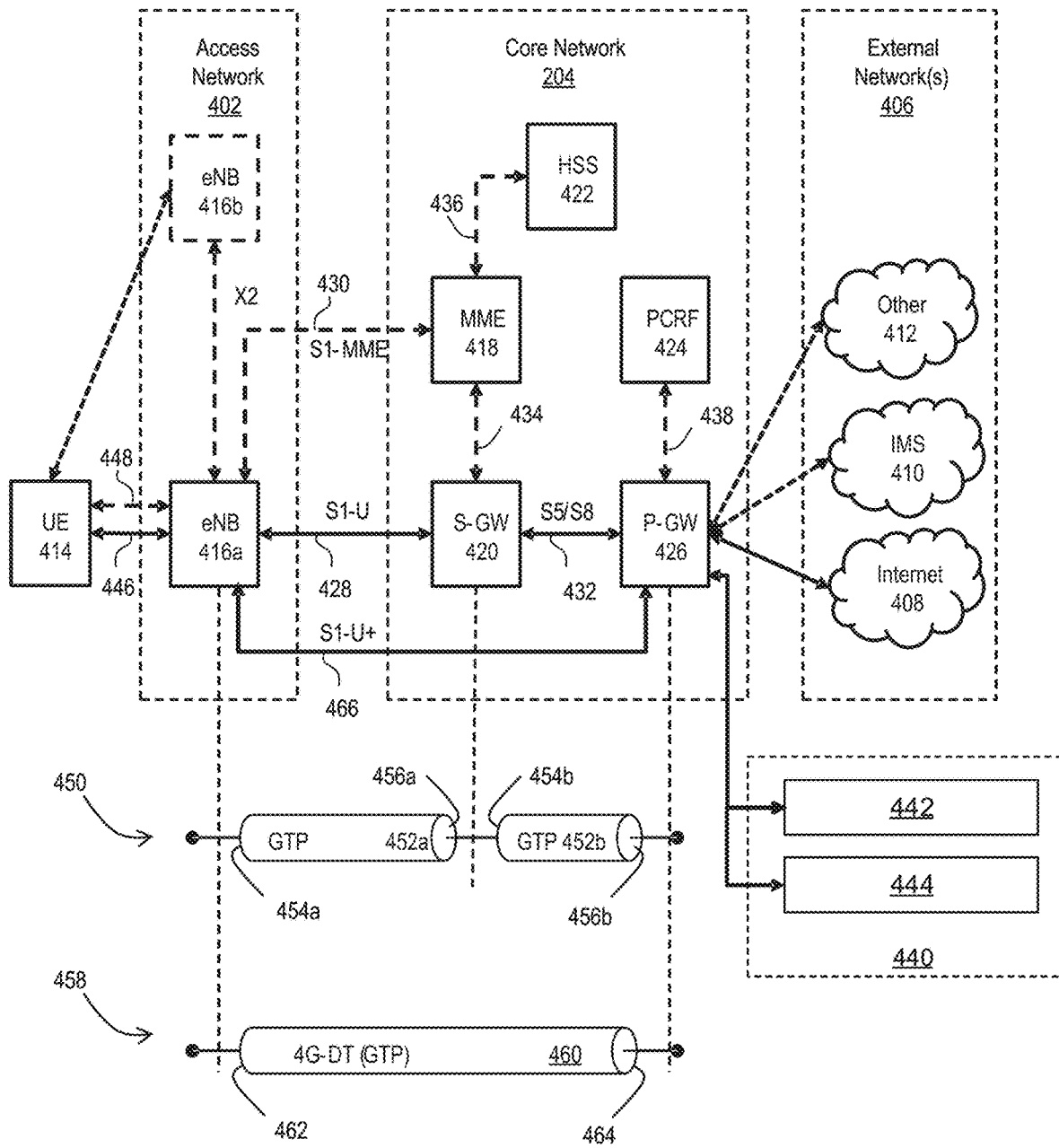
FIG. 5 depicts an exemplary communication system that provide wireless telecommunication services over wireless communication networks with which edge computing node may communicate.

FIG. 5 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications.

Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an Sha signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 5. In other words, either or both of access network 402 and the core network 404 can include additional network elements that are not shown, such as various routers, switches, and controllers. In addition, although FIG. 5 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 5. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 6:
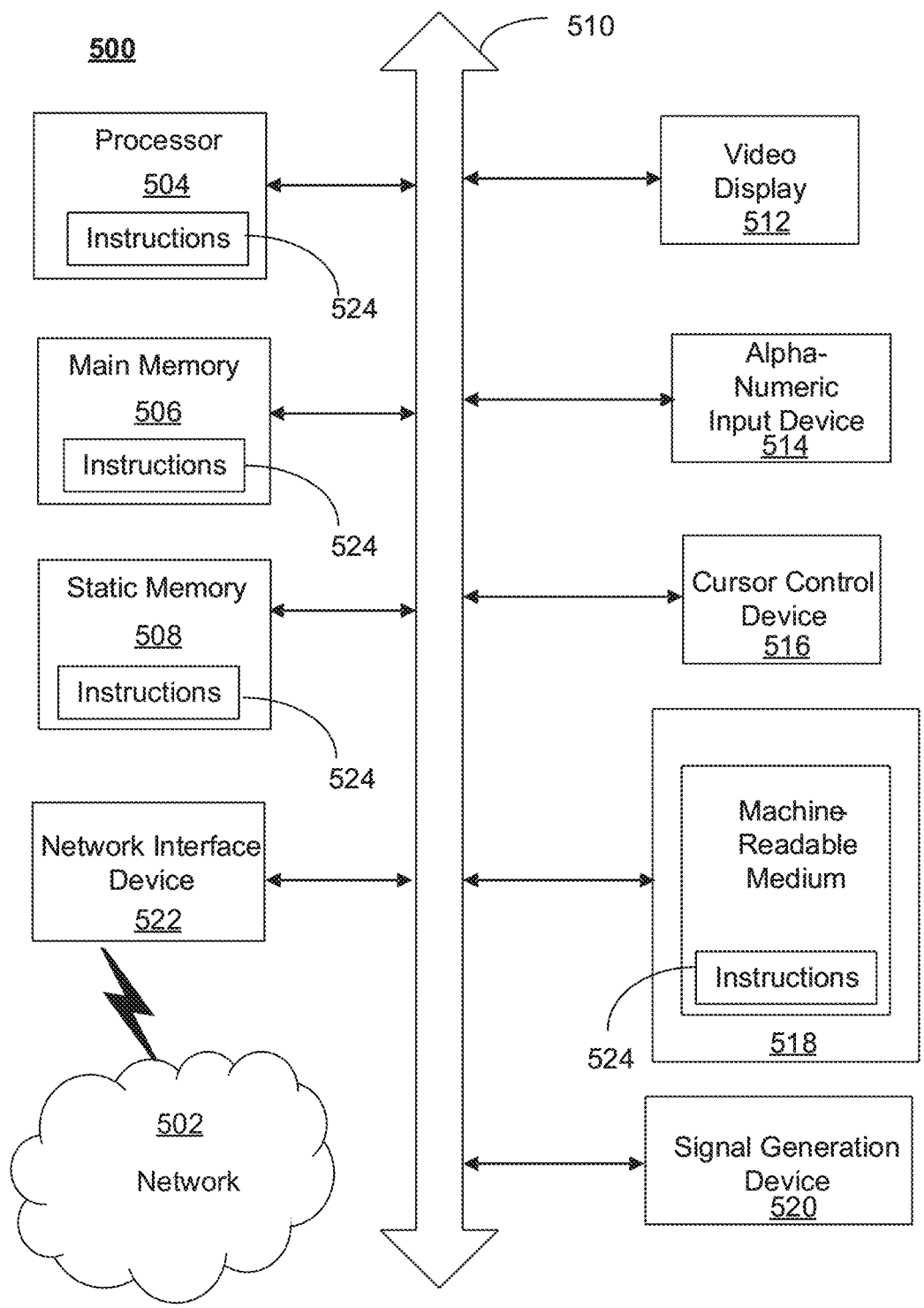
FIG. 6 depicts an exemplary communication system that provide wireless telecommunication services over wireless communication networks with which edge computing node may communicate.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIG. 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
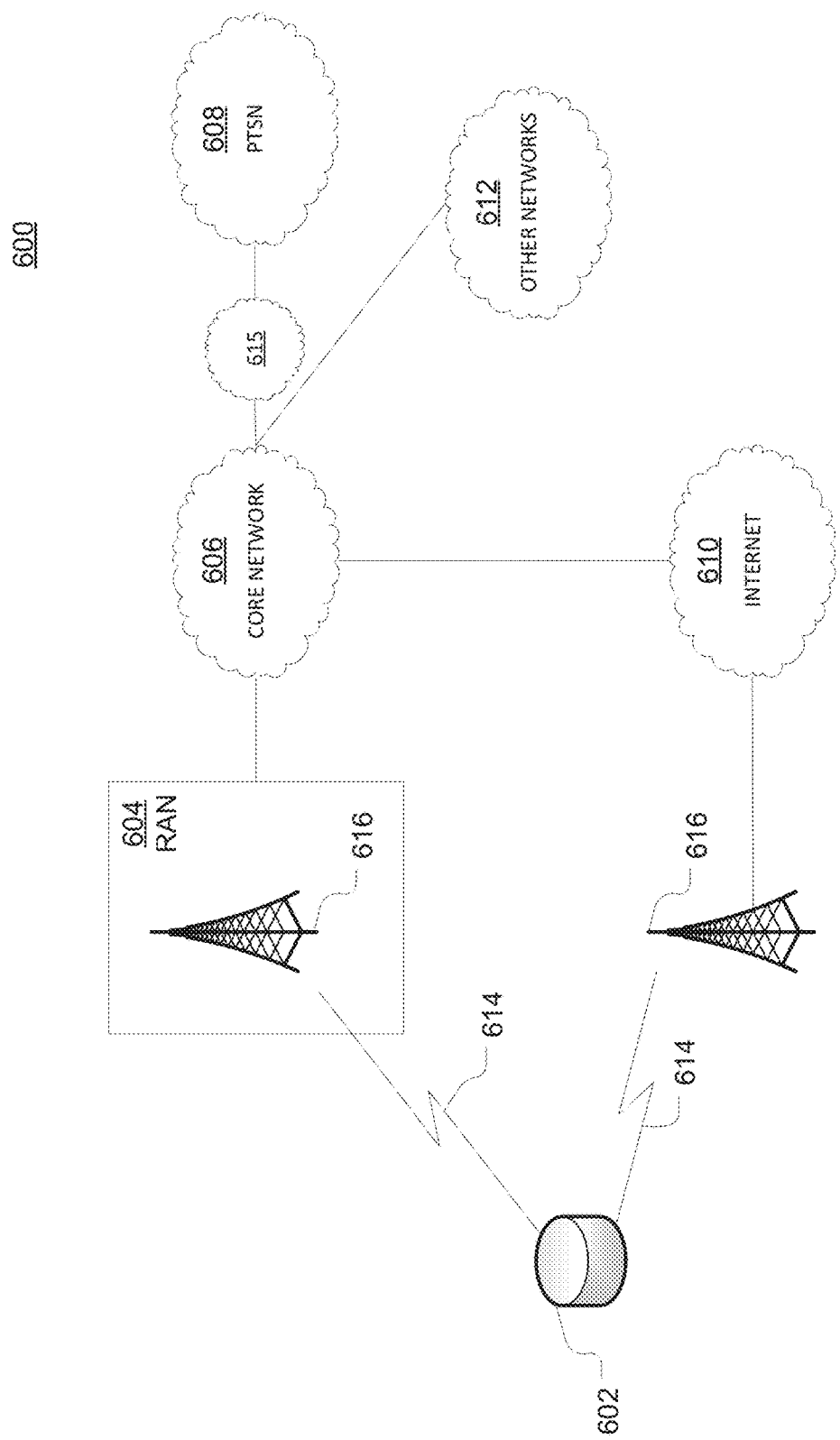
FIG. 7 is a diagram of an exemplary telecommunications system in which the disclosed methods and processes may be implemented with which edge computing node may communicate.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 8:
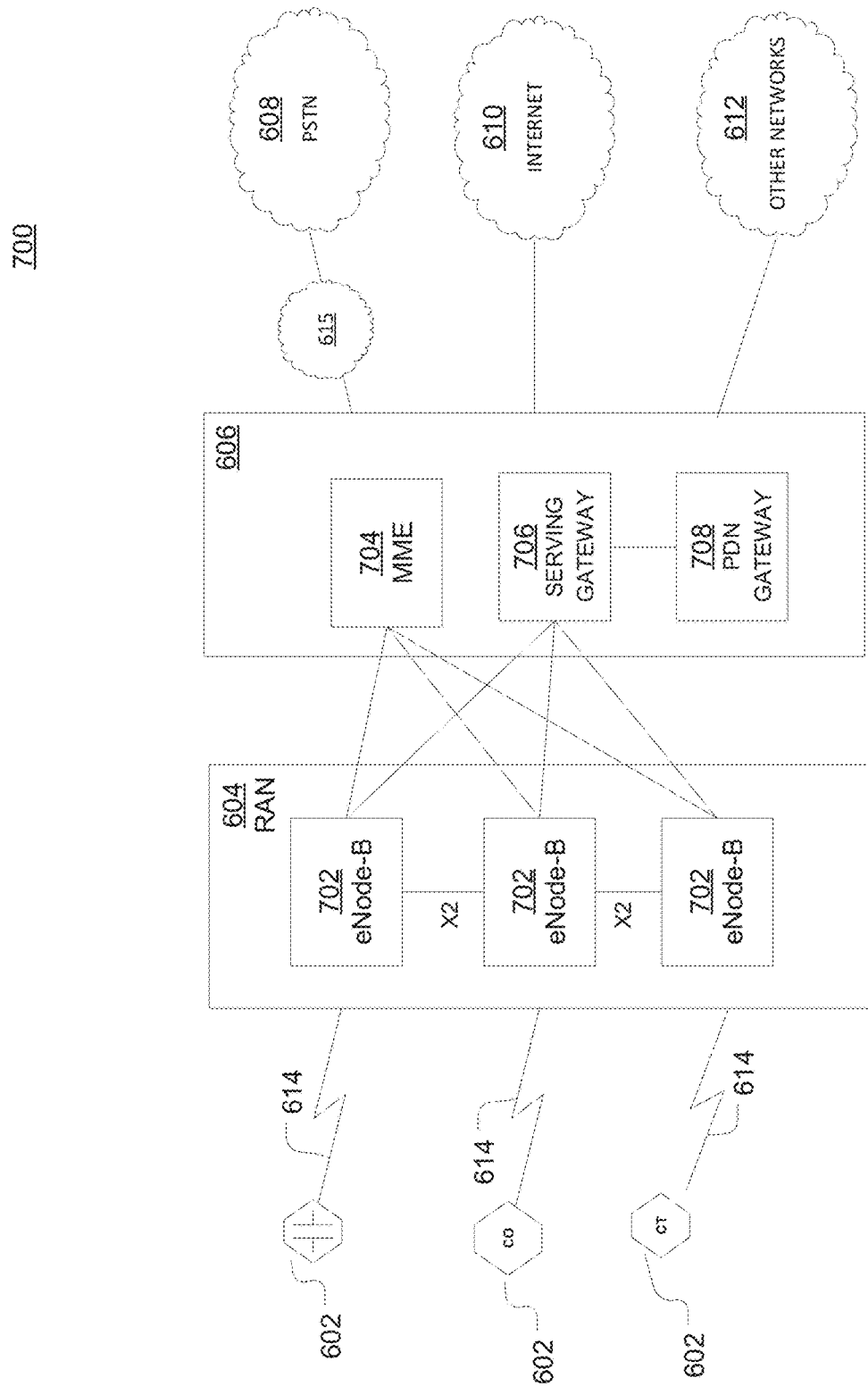
FIG. 8 is an example system diagram of a radio access network and a core network with which edge computing node may communicate.

FIG. 8 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeBs 702 may implement MIMO technology. Thus, one of eNodeBs 702, for example, may use multiple antennas to transmit wireless signals to, or receive wireless signals from, one of WTRUs 602.

Each of eNodeBs 702 may be associated with a particular cell (not shown) and may be configured to handle radio resource management decisions, handover decisions, scheduling of users in the uplink or downlink, or the like. As shown in FIG. 8 eNodeBs 702 may communicate with one another over an X2 interface.

Core network 606 shown in FIG. 8 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeBs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 9:
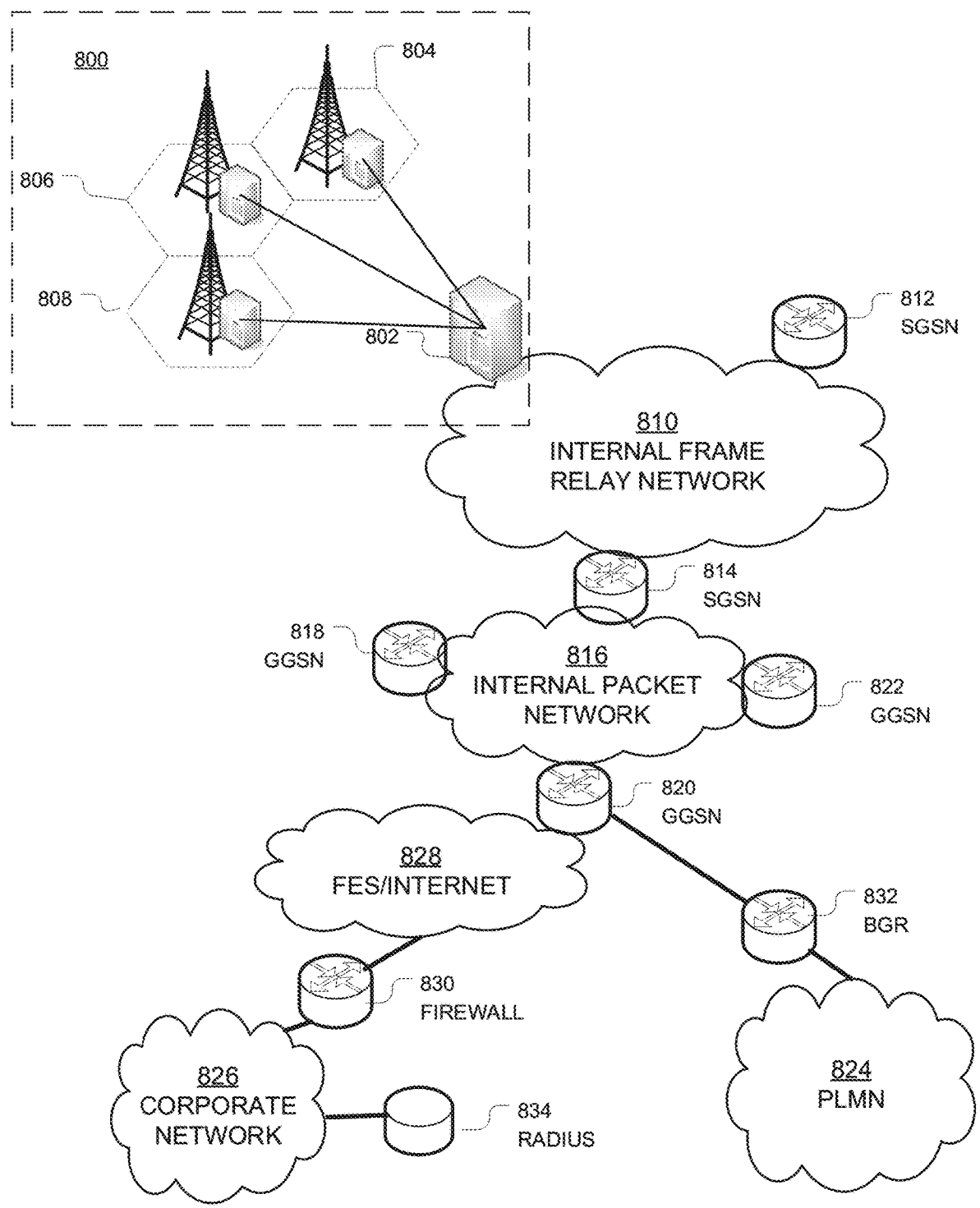
FIG. 9 depicts an overall block diagram of an example packet-based mobile cellular network environment, such as a general packet radio service (GPRS) network, with which edge computing node may communicate.

FIG. 9 depicts an overall block diagram of an example packet-based mobile cellular network environment, such as a GPRS network as described herein. In the example packet-based mobile cellular network environment shown in FIG. 9, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
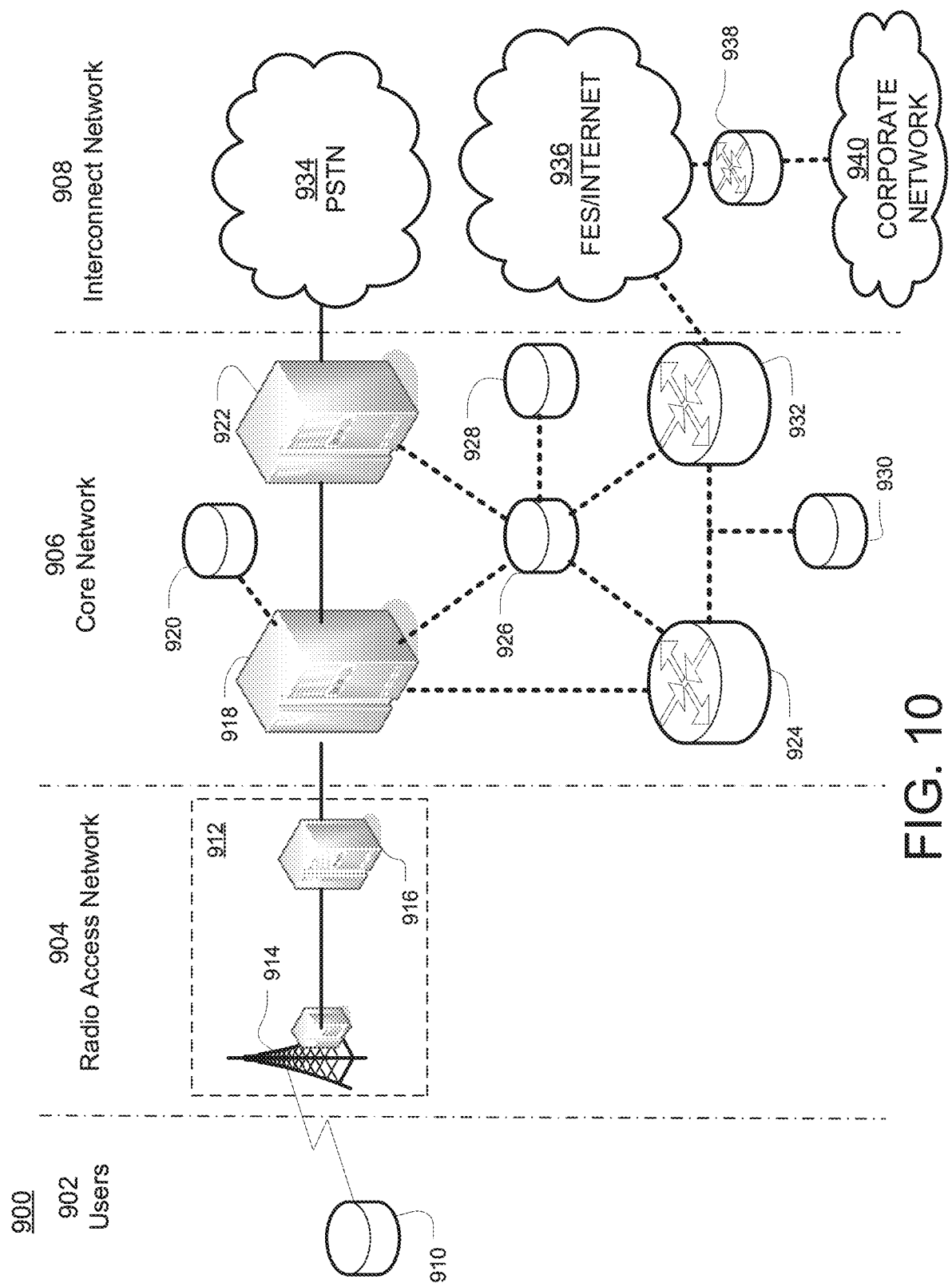
FIG. 10 illustrates an exemplary architecture of a GPRS network with which edge computing node may communicate.

FIG. 10 illustrates an architecture of a typical GPRS network 900 as described herein. The architecture depicted in FIG. 10 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 10. In an example, device 910 comprises a communications device (e.g., IoT devices 32, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 10, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 10, interconnect network 908 comprises a PSTN 934, a FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 11:
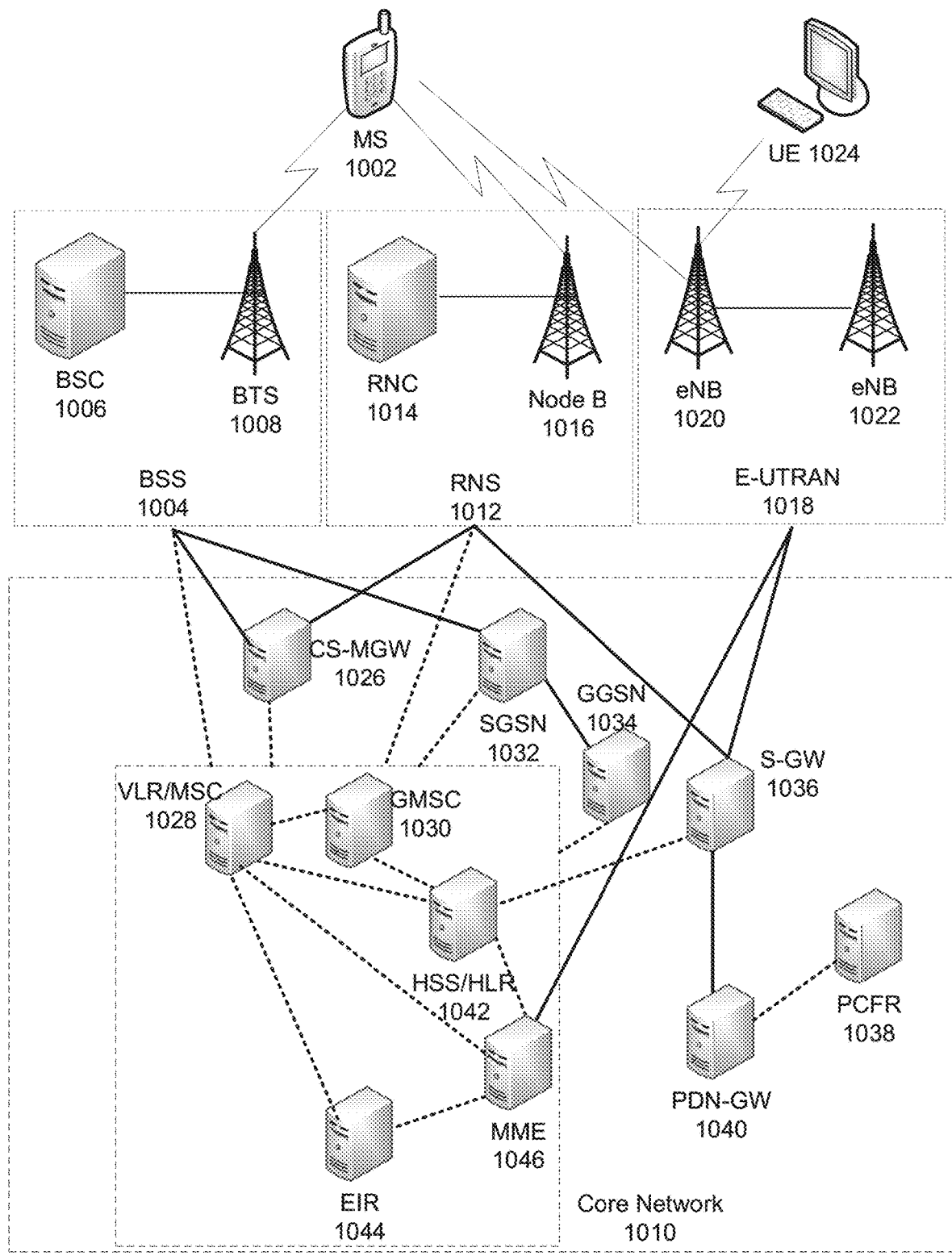
FIG. 11 is a block diagram of an exemplary public land mobile network (PLMN) with which edge computing node may communicate.

FIG. 11 illustrates a PLMN block diagram view of an example architecture that may be replaced by a telecommunications system. In FIG. 11, solid lines may represent user traffic signals, and dashed lines may represent support signaling. MS 1002 is the physical equipment used by the PLMN subscriber. For example, IoT devices 32, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims. The term "or" as used herein is inclusive, unless provided otherwise.

The invention claimed is:

1. A device, the device comprising:
   a processor; and
   a memory coupled with the processor, the memory storing executable instructions that when executed by the processor, cause the processor to effectuate operations comprising:
   generating a plurality of tiles for a designated region;
   classifying each of the plurality of tiles based on whether each tile is associated with a deployment zone;
   clustering locations associated with one or more tiles of the plurality of tiles, wherein the one or more tiles are classified as being associated with the deployment zone, wherein the clustering generates at least one vertex;
   forming a polygon based on the at least one vertex;
   providing a map of the designated region including the polygon at a location in the map associated with the deployment zone, wherein the deployment zone is one or more areas of service within the designated region that are prioritized for new or additional services, or infrastructure based on design criteria; and
   training a classification model using previously selected deployment zones as training data, wherein the classification model classifies each of the plurality of tiles based on whether each tile is associated with a specific zone.

2. The device of claim 1, wherein the processor further effectuates operations comprising obtaining profile data for each of the plurality of tiles, wherein the profile data is used when classifying each of the plurality of tiles.

3. The device of claim 2, wherein the profile data comprises data related to at least one of: mobile application usage for a customer or an indication that the customer is an early adopter of telecommunication services provided by a service provider.

4. The device of claim 1, wherein the processor further effectuates operations comprising obtaining network statistics for each of the plurality of tiles, wherein the network statistics are used when classifying each of the plurality of tiles.

5. The device of claim 1, wherein the processor further effectuates operations comprising obtaining a design criteria, wherein the design criteria is used when classifying each of the plurality of tiles.

6. The device of claim 5, wherein the design criteria comprises data related to at least one of: downlink traffic and monthly data traffic for the designated region.

7. A computer-implemented method comprising:
   generating, by a processor, a plurality of tiles for a designated region;

classifying, by the processor, each of the plurality of tiles based on whether each tile is associated with a deployment zone;

clustering, by the processor, locations associated with one or more tiles of the plurality of tiles, wherein the one or more tiles are classified as being associated with the deployment zone, wherein the clustering generates at least one vertex;

forming, by the processor, a polygon based on the at least one vertex;

providing, by the processor, a map of the designated region including the polygon at a location in the map associated with the deployment zone, wherein the deployment zone is one or more areas of service within the designated region that are prioritized for new or additional services, or infrastructure based on design criteria; and training a classification model using previously selected deployment zones as training data, wherein the classification model classifies each of the plurality of tiles based on whether each tile is associated with a specific zone.

8. The computer-implemented method of claim 7, further comprising obtaining profile data for each of the plurality of tiles, wherein the profile data is used when classifying each of the plurality of tiles.

9. The computer-implemented method of claim 8, wherein the profile data comprises data related to at least one of: mobile application usage for a customer or an indication that the customer is an early adopter of telecommunication services provided by a service provider.

10. The computer-implemented method of claim 7, further comprising obtaining network statistics for each of the plurality of tiles, wherein the network statistics are used when classifying each of the plurality of tiles.

11. The computer-implemented method of claim 7, further comprising obtaining a design criteria, wherein the design criteria is used when classifying each of the plurality of tiles.

12. The computer-implemented method of claim 11, wherein the design criteria comprises data related to at least one of: downlink traffic, monthly data traffic for the designated region, or a customer survey.

13. The computer-implemented method of claim 7, further comprising deploying a cell site based on the location of the polygon.

14. A non-transitory computer-readable storage medium storing executable instructions that when executed by a computing device cause said computing device to effectuate operations comprising:

generating a plurality of tiles for a designated region;

classifying each of the plurality of tiles based on whether each tile is associated with a deployment zone;

clustering locations associated with one or more tiles of the plurality of tiles, wherein the one or more tiles are classified as being associated with the deployment zone, wherein the clustering generates at least one vertex;

forming a polygon based on the at least one vertex; and providing a map of the designated region including the polygon at a location in the map associated with the deployment zone, wherein the deployment zone is one or more areas of service within the designated region that are prioritized for new or additional services, or infrastructure based on design criteria; and training a classification model using previously selected deployment zones as training data, wherein the classification model classifies each of the plurality of tiles based on whether each tile is associated with a specific zone.

15. The computer-readable storage medium of claim 14, further comprising obtaining profile data for each of the plurality of tiles, wherein the profile data is used when classifying each of the plurality of tiles.

16. The computer-readable storage medium of claim 15, wherein the profile data comprises data related to at least one of: mobile application usage for a customer or an indication that the customer is an early adopter of telecommunication services provided by a service provider.

17. The computer-readable storage medium of claim 14, further comprising a design criteria, wherein the design criteria is used when classifying each of the plurality of tiles.

* * * * *